United States Patent
Zeng et al.

(10) Patent No.: US 7,158,542 B1
(45) Date of Patent: Jan. 2, 2007

(54) DYNAMIC PREAMBLE DETECTION

(75) Inventors: Chaohuang Zeng, Sunnyvale, CA (US); William J. McFarland, Los Altos, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 1034 days.

(21) Appl. No.: 10/139,160

(22) Filed: May 3, 2002

(51) Int. Cl.
*A04J 3/06* (2006.01)

(52) U.S. Cl. ............... 370/513; 370/252; 370/350; 375/222

(58) Field of Classification Search ........... 370/252, 370/338, 503, 509, 512, 513, 350; 375/141, 375/259, 130, 220–222

See application file for complete search history.

(56) References Cited

U.S. PATENT DOCUMENTS

| | | | | |
|---|---|---|---|---|
| 4,410,990 | A | 10/1983 | Wilkinson | 714/718 |
| 5,151,920 | A | 9/1992 | Haagh et al. | 375/150 |
| 6,331,976 | B1 * | 12/2001 | Sriram | 370/350 |
| 6,373,899 | B1 * | 4/2002 | Krasner | 375/259 |
| 6,643,318 | B1 * | 11/2003 | Parsa et al. | 375/141 |
| 2001/0017881 | A1 * | 8/2001 | Bhatoolaul et al. | 375/130 |
| 2002/0159531 | A1 | 10/2002 | Reagan et al. | 375/260 |

FOREIGN PATENT DOCUMENTS

| EP | 0 715 440 A1 | 6/1996 |
|---|---|---|
| EP | 1 185 048 A2 | 3/2002 |
| EP | 1 191 730 A1 | 3/2002 |
| EP | 1 185 048 A3 | 6/2003 |

OTHER PUBLICATIONS

IEEE Std 802.11b/D8.0, Sep. 2001.
Proakis, John G., "Digital Communications" Third Edition, pp. 583-593.
"Supplement to IEEE Standard for Information Technology. Part 11: Wireless LAN Medium Access Control (MAC) and Physical Layer (PHY) specifications: Higher-Speed Physical Layer Extension in the 2.4 GHz Band" IEEE STD 802.11B-1999, xx, xx, Jan. 20, 2000, pp. 1090 XP002189756.

* cited by examiner

*Primary Examiner*—John Pezzlo
(74) *Attorney, Agent, or Firm*—Van Pelt, Yi & James LLP

(57) ABSTRACT

A system and method are disclosed for dynamic preamble detection. A subset of the bits comprising the synchronization portion of the preamble are decoded, de-scrambled, and analyzed to determine dynamically which preamble format is being used. The source data values for the synchronization bits for a first preamble format are different than the source data values for the synchronization bits for a second preamble format and the receiving system uses the difference to determine which preamble format has been used. The information concerning which format has been used may be used to extend a synchronization operation.

16 Claims, 9 Drawing Sheets

DYNAMIC PREAMBLE DETECTION

CROSS REFERENCE TO RELATED APPLICATIONS

This application is related to co-pending U.S. patent application Ser. No. 10/139,653 entitled "Modified Start Frame Delimiter Detection," filed May 3, 2002, which is incorporated herein by reference for all purposes.

FIELD OF THE INVENTION

The present invention relates generally to wireless communications. More specifically, dynamic detection of a data packet preamble is disclosed.

BACKGROUND OF THE INVENTION

Packet switched network protocols, in which data is sent from one network node to another in the form of one or more discrete packets, have long been used in conventional wired networks to manage the exchange of data between network nodes. In wireless communications, it is sometimes advantageous to employ a protocol that allows for the transmission and receipt of data packets. One such environment is the wireless local area network (LAN) environment.

To facilitate the development and use of wireless LAN ("WLAN" or "WiLAN") technology, the Institute of Electrical and Electronics Engineers (IEEE) has promulgated a series of standards, the IEEE Standard 802.11 series, to provide standardized specifications for the medium access control (MAC) and physical layer (PHY) for such a wireless LAN. IEEE Standard 802.11b provides the specifications for extending the PHY layer in the 2.45 GHz band.

IEEE Standard 802.11b prescribes a packet format in which each packet comprises a preamble portion, a header portion, and a data portion, transmitted in that order. In general, the preamble portion is used by the receiving system to recognize that a packet is being received and to perform synchronization operations to enable the receiving system to reliably receive and interpret the incoming packet. The header portion typically is used to provide to the receiving system information concerning the data portion that will follow, such as by indicating how much data is being sent in the packet and what signaling method is being used to transmit the data portion. The data portion, sometimes referred to as the "payload" of the packet, comprises all or a part of a message the sending system is communicating to the receiving system. The message may comprise, for example, a request for data available from the receiving system or data sent by the sending system in response to a request received from the receiving system. How the data is processed at the receiving system may be dictated, for example, by an application layer protocol or application program running on the receiving system.

In certain environments, such as in a wireless LAN environment operating under IEEE Standard 802.11b, more than one packet format may be used. For example, IEEE Standard 802.11b specifies a long preamble format and a short preamble format. The long preamble format may be needed, for example, for use with legacy or other systems that employ the 1 Megabit per second (Mbps) mode of operation under IEEE Standard 802.11b. The short preamble format, on the other hand, may be suitable for use with higher data rate modes of operation, such as for 2 Mbps, 5.5 Mbps, and 11 Mbps modes of operation.

Under IEEE Standard 802.11b, for both the long preamble format and the short preamble format the preamble comprises a first set of bits to be used for synchronization operations and a second set of bits, termed the "start frame delimiter" (SFD), which second set of bits the receiving system uses to recognize that the end of the preamble has been reached and the header portion of the packet is about to begin.

In certain implementations under IEEE Standard 802.11b, for example, or under other wireless communication protocols comprising more than one preamble format, it may be advantageous to determine dynamically, while the preamble is being processed (e.g., while synchronization operations are being performed), which preamble format is being used. For example, under IEEE Standard 802.11b, it may be advantageous to determine dynamically, during synchronization, that the long preamble format is being used. Under IEEE Standard 802.11b, the long preamble format comprises 128 bits for synchronization and a 16-bit SFD. By contrast, the short preamble format comprises just 56 bits for synchronization and a (different) 16-bit SFD. Therefore, based on dynamic detection of the preamble type the receiving system would know whether it could perform more extensive synchronization operations—because more bits would be available in the longer preamble format—in order to achieve better synchronization and channel sensitivity and thereby ensure more reliable interpretation of the received signal. This may be particularly important under a protocol such as IEEE Standard 802.11b, under which the long preamble format must be used with the lower data rate mode of operation (1 Mbps), which typically exhibits a lower signal-to-noise ratio (SNR) such that better synchronization may be required than for the higher data rate modes of operation, which typically have a higher SNR. Therefore, for situations in which a system may be required to be configured to receive and process data packets having more than one type of preamble, there is a need for a way to detect dynamically which preamble format is being used.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A system and method are disclosed for dynamic preamble detection. In one embodiment, a subset of the bits comprising the synchronization portion of the preamble are decoded, de-scrambled, and analyzed to determine which preamble format is being used. In one embodiment, the source data values for the synchronization bits for a first preamble format are different than the source data values for the synchronization bits for a second preamble format and the receiving system uses the difference to determine which preamble format is being used.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
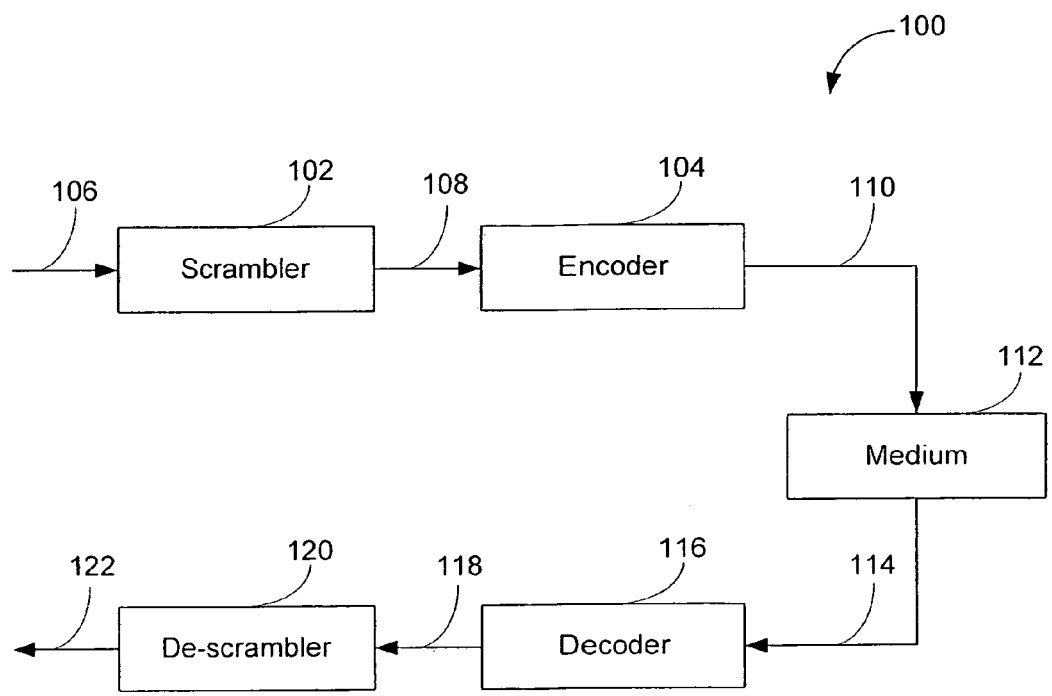
FIG. 1 is a schematic diagram of a typical transmission system 100. On the transmit side, the transmission system 100 comprises a scrambler 102 and an encoder 104.

FIG. 1 is a schematic diagram of a typical transmission system 100. On the transmit side, the transmission system 100 comprises a scrambler 102 and an encoder 104. The scrambler 102 receives as input source data 106, scrambles the source data 106, and provides as output scrambled data 108. The scrambled data 108 is provided as input to the encoder 104, which provides as output an encoded signal 110 for transmission. The encoded signal 110 is transmitted through a medium 112 and is received by the receiving end of the transmission system as a received signal 114. On the receiving end, the received signal 114 is decoded by a decoder 116, which provides as output a decoded received signal 118. The decoded received signal 118 is provided as input to a de-scrambler 120, which reverses the process performed by scrambler 102 to provide as output a decoded and de-scrambled received signal 122.

Figure 2:
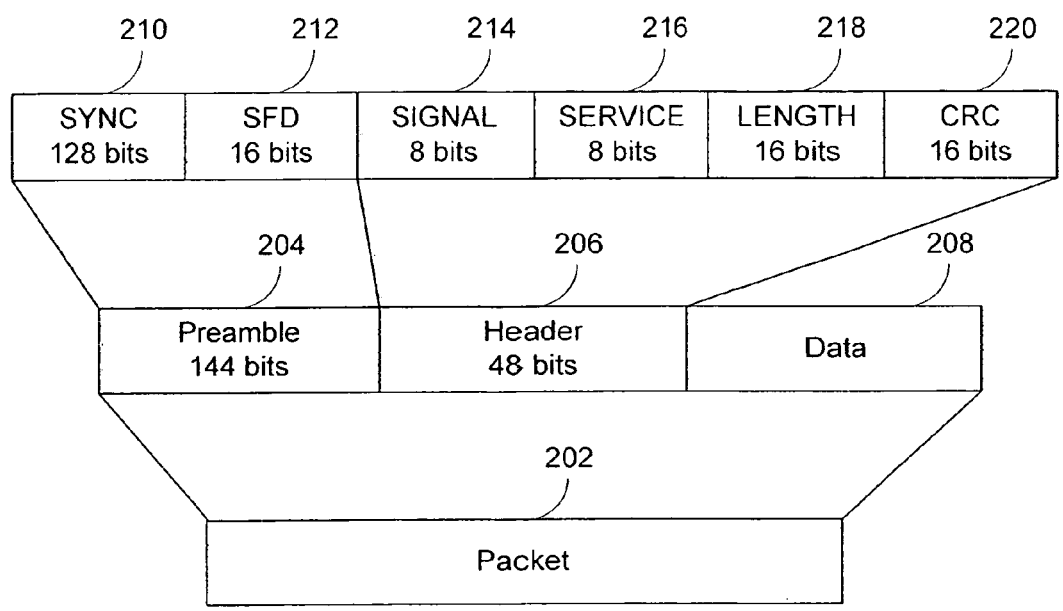
FIG. 2 is a schematic diagram showing the structure of a data packet transmitted under IEEE Standard 802.11b for a packet in which the long preamble format is used.

FIG. 2 is a schematic diagram showing the structure of a data packet transmitted under IEEE Standard 802.11b for a packet in which the long preamble format is used. The packet 202 comprises a preamble portion 204, a header portion 206, and a data portion 208. The preamble portion 204 comprises 144 bits, which is the prescribed length for a long preamble under IEEE Standard 802.11b. The header portion 206 comprises 48 bits, and the data portion 208 comprises a variable number of bits depending on the amount of data included in the packet. The preamble portion 204 comprises a synchronization portion 210, comprising 128 bits, and a start frame delimiter (SFD) portion 212 comprising 16 bits. The header portion 206 comprises a signaling portion 214 used to provide an 8-bit long code identifying which of the modes of operation under IEEE Standard 802.11b is being used to send the data portion of the packet. The standard prescribes a code for each of the four modes of operation, 1 Mbps, 2 Mbps, 5.5 Mbps, and 11 Mbps. The header portion 206 further comprises a service portion 216 comprising 8 bits. Under IEEE Standard 802.11b, only three of the bits are currently assigned a function, with the remaining bits being reserved for future use. Of the three bits designated for use in the standard, one is used to extend the length field, described below, to resolve a potential ambiguity in the information that may be provided in the length portion; and of the remaining two, one is used to indicate the modulation method used and the second is used to indicate whether the transmit frequency and symbol clocks are derived from the same oscillator. The header portion 206 further comprises a length portion 218. The length portion 218 is used to provide an indication of how much data is included in the data portion 208 of the packet. Under IEEE Standard 802.11b, the data provided in the length portion 218 of the header portion 206 indicates the length expressed as a transmission time for the data portion 208. The standard provides formulas for calculating the time based on how much data is to be sent. The header portion 206 further comprises a cyclic redundancy code (CRC) portion 220. The CRC portion 220 comprises 16 bits and is used to detect errors in the header portion 206 by storing the calculation of a result based on the data contained in the signaling portion 214, the service portion 216, and the length portion 218 of the header 206. At the receiving end, the receiving system repeats the calculation used to calculate the CRC code stored in the CRC portion 220 and verifies that the result of the calculation on the receiving end matches the result stored in the CRC portion 220 of the header portion 206.

Figure 3:
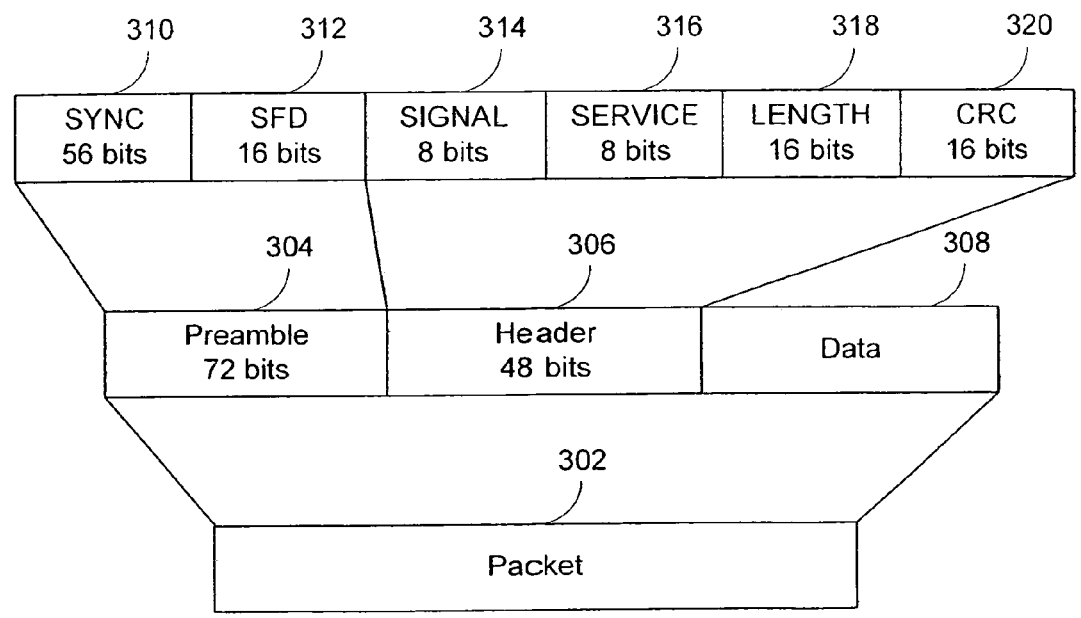
FIG. 3 shows a packet 302 in which the short preamble format prescribed in IEEE Standard 802.11b is used.

FIG. 3 shows a packet 302 in which the short preamble format prescribed in IEEE Standard 802.11b is used. The packet 302 comprises a preamble portion 304 comprising 72 bits, a header portion 306 comprising 48 bits, and a data portion 308, the length of which is determined by the amount of data being sent in the packet. Comparing FIG. 2 and FIG. 3, the preamble 204 of FIG. 2 comprises 144 bits whereas the preamble 304 of FIG. 3 comprises only 72 bits. The preamble 304 of FIG. 3 comprises a synchronization portion 310 and an SFD portion 312. The synchronization portion 310 comprises 56 bits, compared to the 128 bits included in the synchronization portion 210 of the long preamble shown in FIG. 2. The SFD portion 312 comprises 16 bits, the same length as the SFD portion 212 of the preamble 204 shown in FIG. 2. The difference, under IEEE Standard 802.11b, is that the SFD prescribed for a short format preamble such as shown in FIG. 3 is the reverse of the 16-bit SFD code prescribed for a packet in which the long preamble format is used. A further difference under IEEE Standard 802.11b is that for the long preamble format, the 128 bits of the synchronization portion 210 comprise 128 scrambled 1's, whereas the 56 bits stored in the synchronization portion 310 of the short format preamble shown in FIG. 3 comprise a series of 56 scrambled 0's. Therefore, in addition to the length of the synchronization portion of the preamble, the long format preamble and the short format preamble differ from each other in terms of (1) the data used for the synchronization portion and (2) the code used for the SFD. The header portion 306 of the packet 302 shown in FIG. 3 comprises a signaling portion 314, a service portion 316, a length portion 318, and a CRC portion 320 all of which are the same length as and perform the same function as the corresponding portions of the header 206 shown in FIG. 202.

Figure 4:
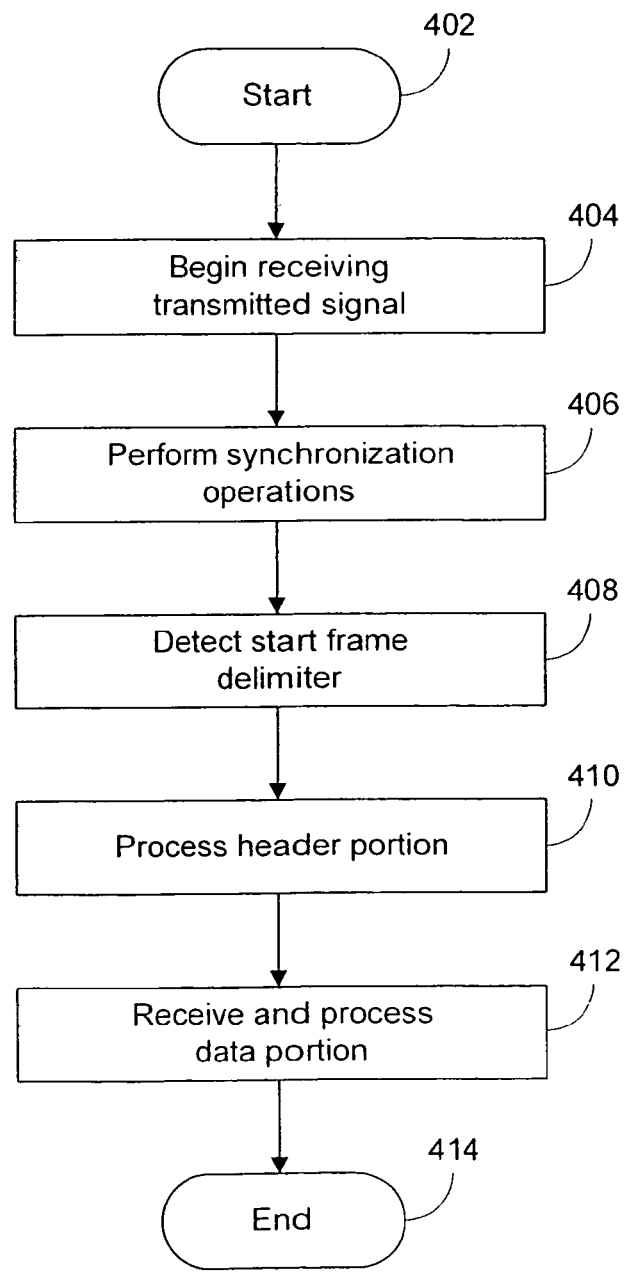
FIG. 4 is a flowchart illustrating a process used in one embodiment to receive and process a data packet.

FIG. 4 is a flowchart illustrating a process used in one embodiment to receive and process a data packet. In one embodiment, the data packet comprises a data packet sent under IEEE Standard 802.11b, using either the long preamble format or the short preamble format. The process starts at step 402, in which the receiving system is in standby mode, and proceeds to step 404 in which the receiving system begins receiving a transmitted signal. In step 406, the receiving system performs synchronization operations. In one embodiment, the synchronization operations performed in step 406 comprise operations used to enable the receiving system to process the received signal in such a way as to be able to more reliably interpret the signal and determine what signal was transmitted by the transmitting station, as described more fully below in connection with FIG. 5. In step 408, the start frame delimiter (SFD) is detected by the receiving system. In one embodiment, the start frame delimiter is detected by scanning the decoded and de-scrambled received signal for a match to the SFD prescribed for the type of packet received. In one embodiment, as described more fully below, the synchronization operations performed in step 406 comprise dynamic detection of the type of preamble used for the received packet and association of the type of preamble received with the start frame delimiter prescribed for a data packet of the type received. In one embodiment, IEEE Standard 802.11b applies and dynamic preamble detection is used to determine whether the long preamble format or the short preamble format was used for the data packet. Based on the determination of which preamble format is being used, in one embodiment the receiving system in step 408 scans the decoded and de-scrambled received signal to detect the SFD prescribed in the 802.11b standard for a data packet having the preamble format detected in step 406. In one embodiment, in step 408 the receiving system detects the start frame delimiter by scrambling the SFD prescribed by the applicable standard or specification and scanning the decoded but not yet de-scrambled received signal for a match to the scrambled version of the SFD. Once the SFD is detected in step 408, the header portion of the data packet, which begins immediately after the end of the SFD, as described above, is processed in step 410. In one embodiment, in step 410 the signaling mode, length, and service data are read and processed, as described above, and the CRC portion of the header is read and compared to a CRC result determined by the receiving system based on the received data for the signaling, service, and length portions of the header, as described above. In step 412, the data portion of the packet is received and processed. In one embodiment, the receipt and processing of the data portion of the packet in step 412 is determined by application layer protocols and/or application programs associated with the data portion of the packet. The process shown in FIG. 4 then ends in step 414.

Figure 5:
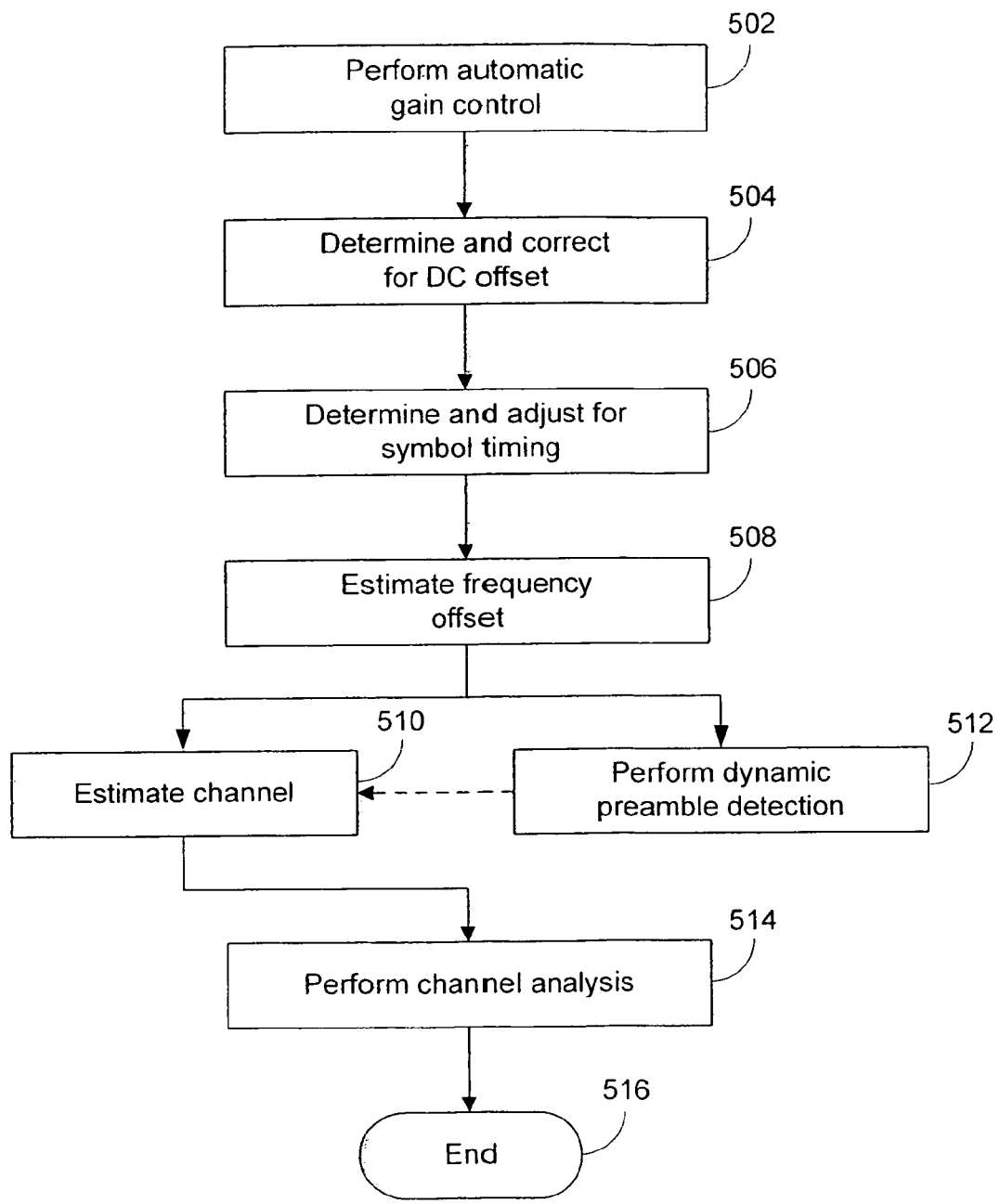
FIG. 5 is a flowchart illustrating a process used in one embodiment to perform synchronization operations, as in step 406 of the process shown in FIG. 4.

FIG. 5 is a flowchart illustrating a process used in one embodiment to perform synchronization operations, as in step 406 of the process shown in FIG. 4. The process begins in step 502 in which automatic gain control operations are performed. In one embodiment, the automatic gain control operations performed in step 502 are used to scale the received signal to a level suitable for processing by analog-to-digital circuitry and/or components associated with the receiving system. In one embodiment comprising an implementation of the IEEE Standard 802.11b, approximately 9 bits of the synchronization portion of the preamble are used in step 502 to perform automatic gain control. In step 504, the receiving system determines and corrects for direct current (DC) offset. In one embodiment approximately 2 or 3 bits are required to perform the DC offset correction in step 504. In step 506, the receiving system determines and adjusts for the symbol timing. Under the 802.11b standard, for example, each bit of data is encoded using an 11-bit Barker sequence, such that is necessary to determine where in the receiving signal each 11 chip symbol begins. In step 508, the frequency offset is estimated. In one embodiment, approximately 16 bits of the synchronization portion of the preamble are required to estimate the frequency offset, which in a manner comprises synchronizing the receiving system clock with the transmitting system clock.

In step 510, channel estimation is performed. In one embodiment, the channel estimation performed in step 510 comprises estimating and correcting or adjusting for the characteristics of the transmission channel being used to send the transmitted signal from the transmitting station to the receiving station. In one embodiment, channel estimation comprises creating a mathematical model of the channel characteristics. In one embodiment, due to the limited number of synchronization bits available in the synchronization portion of the preamble when the short preamble format is used, only 16 bits of the synchronization portion of the preamble are allocated to channel estimation for data packets in which the short preamble format is used. The 16 bits allocated for short preamble format channel estimation, however, may not be enough to estimate the channel sufficiently in all cases, and may not be sufficient in particular for a data packet where the long preamble format has in fact been used. This is so because under IEEE Standard 802.11b the long preamble format is used with the lower data rate mode of operation, i.e., the 1 Mbps mode of operation, for which the signal to noise ratio (SNR) is lower than it is for the higher data rate modes of operation. There is greater need to more accurately estimate the channel for packets sent using the 1 Mbps mode of operation, therefore, since the data component of the received signal is lower relative to the noise component of the received signal. Therefore, in one embodiment, the receiving system is configured to perform dynamic preamble detection in step 512 of the process shown in FIG. 5, the dynamic preamble detection being performed at the same time as the channel estimation being performed in step 510. In one embodiment, the dynamic preamble detection is used to determine if the long preamble format is in fact being used. If it is determined in step 512 that the long preamble format is being used, the channel estimation process of step 510 is extended based on that result and additional bits are used to perform further, or to further refine, the channel estimation performed in step 510. As a result, when a long preamble format has been detected, a more extensive and accurate channel estimation is completed, which results in better reliability and sensitivity at the receiving system. If in step 512 it is determined that the short preamble format is being used, then in step 510 the channel estimation algorithm corresponding to the short preamble format is completed and no additional synchronization bits are used for further channel estimation. In one embodiment, if the long preamble format has been detected, a total of about 48 bits of the synchronization bits are made available to perform channel estimation in step 510. In step 514 of the process shown in FIG. 5, channel analysis is performed based on the remaining bits available of the synchronization bits. In one embodiment approximately 4 or 5 bits are used for channel analysis. The process shown in FIG. 5 then ends in step 516.

Figure 6:
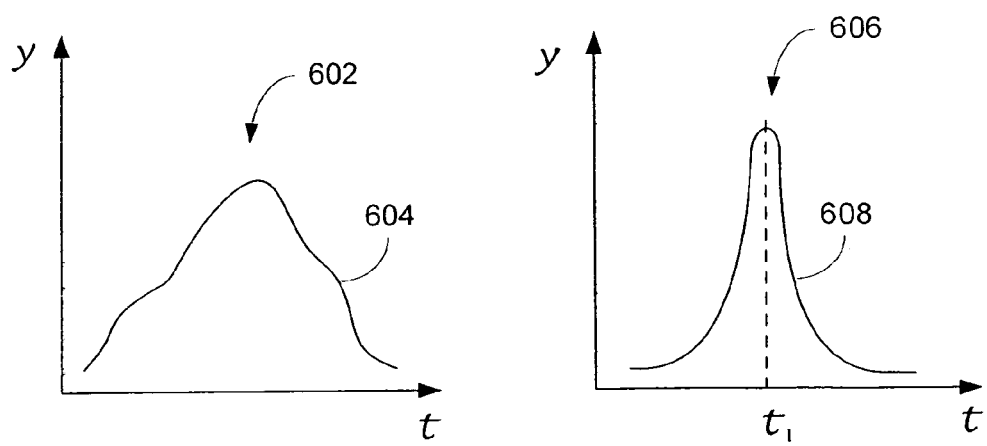
FIG. 6 illustrates the benefits achieved by performing channel estimation, as in step 510 of the process shown in FIG. 5.

FIG. 6 illustrates the benefits achieved by performing channel estimation, as in step 510 of the process shown in FIG. 5. A first graph 602 shows a portion 604 of a received signal in the time domain. As shown in graph 602, the received energy of the portion 604 is spread over the time domain such that it is not clear what data value has been received and at what precise time. By contrast, in the graph 606 to the right of the graph 602, the portion 608 of the received signal corrected based on the channel estimation, such as by processing the received signal using a match filter or rake receiver based on the channel estimation, exhibits a distinct peak received at a readily determined time $t_1$. In general, as described above, the more synchronization bits that are available to perform channel estimation, the more closely the receiving system will be able to model the channel and correct the received signal to provide as a corrected received signal a signal that more nearly approaches the ideal waveform shown in graph 606 of FIG. 6.

Figure 7:
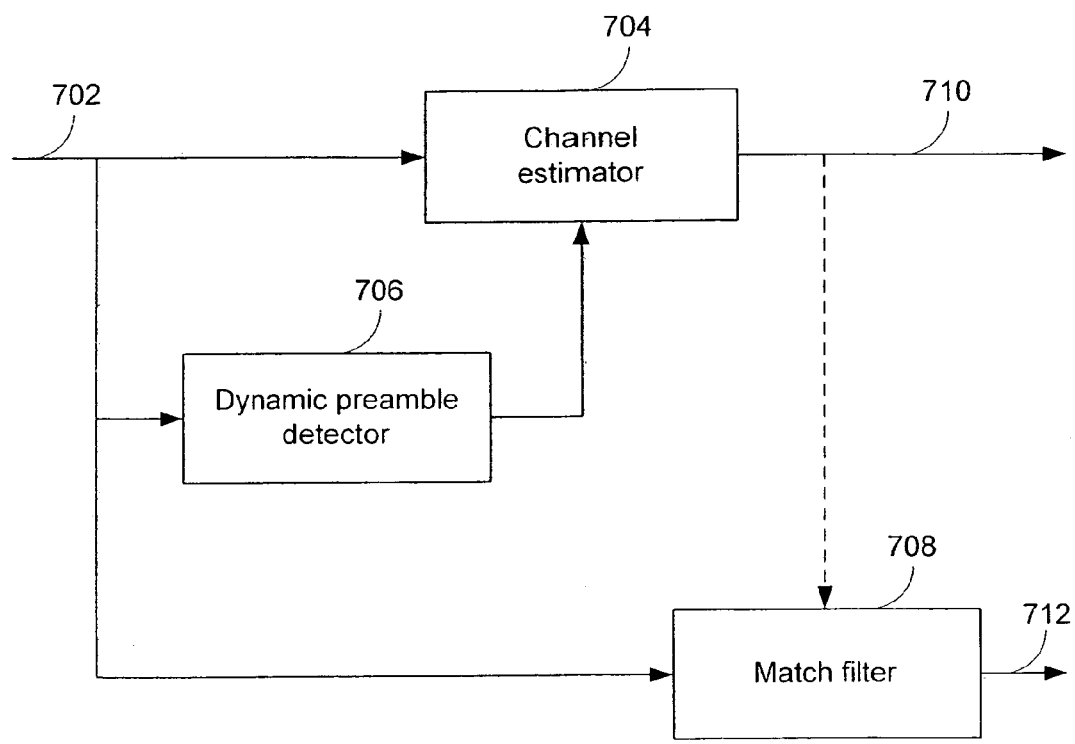
FIG. 7 is a schematic diagram that further illustrates the process of channel estimation and dynamic preamble detection, as in steps 510 and 512 of the process shown in FIG. 5.

FIG. 7 is a schematic diagram that further illustrates the process of channel estimation and dynamic preamble detection, as in steps 510 and 512 of the process shown in FIG. 5. A received signal 702 is split and provided as input to a channel estimator 704, a dynamic preamble detector 706, and a match filter 708. During processing of the preamble portion of a received data packet, the received signal 702 comprises a series of synchronization bits, as described above. As the synchronization bits comprising the received signal 702 are provided to the channel estimator 704, the channel estimator 704 processes the received bits using well-known channel estimation techniques to create a mathematical model of the channel and how the channel is affecting the transmitted signal prior to its receipt by the receiving system.

In one embodiment, as described above, initially the channel estimator 704 assumes that only 16 bits of synchronization data will be available for use in channel estimation. The channel estimator 704 in one embodiment is configured to assume initially that the preamble is a short preamble and to complete channel estimation based on 16 bits unless the dynamic preamble detector 706 informs the channel estimator 704 that the long preamble format was used, such that additional synchronization bits are available to the channel estimator 704. While the channel estimator 704 is performing initial channel estimation operations, the dynamic preamble detector 706 is receiving the same synchronization bits as are being processed initially by the channel estimator 704. The dynamic preamble detector 706 is configured to determine based on the synchronization bits received by the dynamic preamble detector 706 whether the short or the long preamble format was used for the data packet being processed. If the dynamic preamble detector 706 determines that the long preamble format was used, the dynamic preamble detector 706 outputs this result to the channel estimator 704 to inform the channel estimator 704 that additional bits are available to the channel estimator 704 for channel estimation.

The received signal 702 is also provided, as noted above, to the match filter 708. Initially the match filter 708 is not properly configured to process the received signal 702. The match filter 708 is configured to receive from the channel estimator the channel estimation model provided as output 710 by the channel estimator 704. In one embodiment, the channel estimation model is provided as a time domain function ĥ(t). In one embodiment the match filter 708 is configured to calculate the conjugate function, h*(−t), based on the channel model, to enable the match filter to process the received signal so as to remove from the received signal the estimated effects of the channel on the originally transmitted signal. The output 712 of the match filter 708 then represents a more reliable approximation of the originally transmitted signal and is used for subsequent processing, such as the processing by the receiving system of the data portion of the received packet. In one embodiment, a rake receiver is used in place of the match filter 708.

Figure 8:
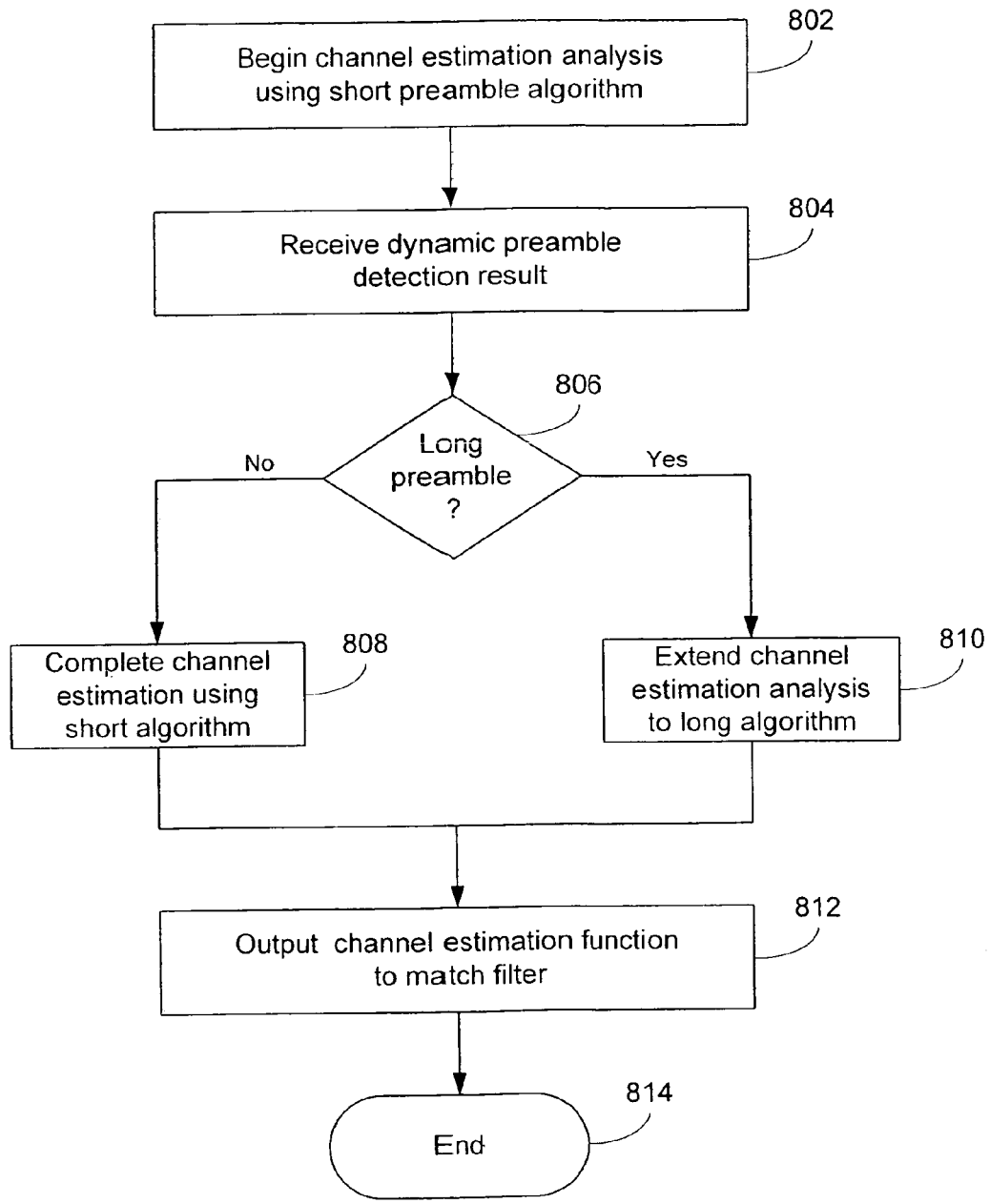
FIG. 8 is a flowchart illustrating a process used in one embodiment to perform channel estimation, as in step 510 of the process shown in FIG. 5.

FIG. 8 is a flowchart illustrating a process used in one embodiment to perform channel estimation, as in step 510 of the process shown in FIG. 5. The process begins with step 802 in which the system begins channel estimation analysis using a short preamble format algorithm. In one embodiment, the short preamble format algorithm assumes that only 16 bits will be available to the system for channel estimation. In step 804, a dynamic preamble detection result is received. In one embodiment, the dynamic preamble detection result comprises an indication as to whether the short preamble format or the long preamble format of IEEE Standard 802.11b was used for the received packet. In step 806, it is determined whether the long preamble format was used for the received packet. If it is determined in step 806 that the long preamble format was not used, the process proceeds to step 808, in which the channel estimation process is completed using the short preamble format algorithm. If it is instead determined in step 806 that the long preamble format was used, the process proceeds to step 810 in which the channel estimation analysis is extended to a long preamble format algorithm in which additional bits are used to perform channel estimation. In one embodiment, if the long preamble format has been used, the system uses a total of about 48 bits to perform channel estimation. Once the channel estimation has been completed, either in step 808 using the short preamble format algorithm or in step 810 using the long preamble format algorithm, the process proceeds to step 812 in which a channel estimation function is output to a match filter to be used to correct for the estimated channel effects. In one embodiment, as mentioned above, the output is instead sent to a rake receiver used to perform the same function as the match filter. The process shown in FIG. 8 then ends in step 814.

Figure 9:
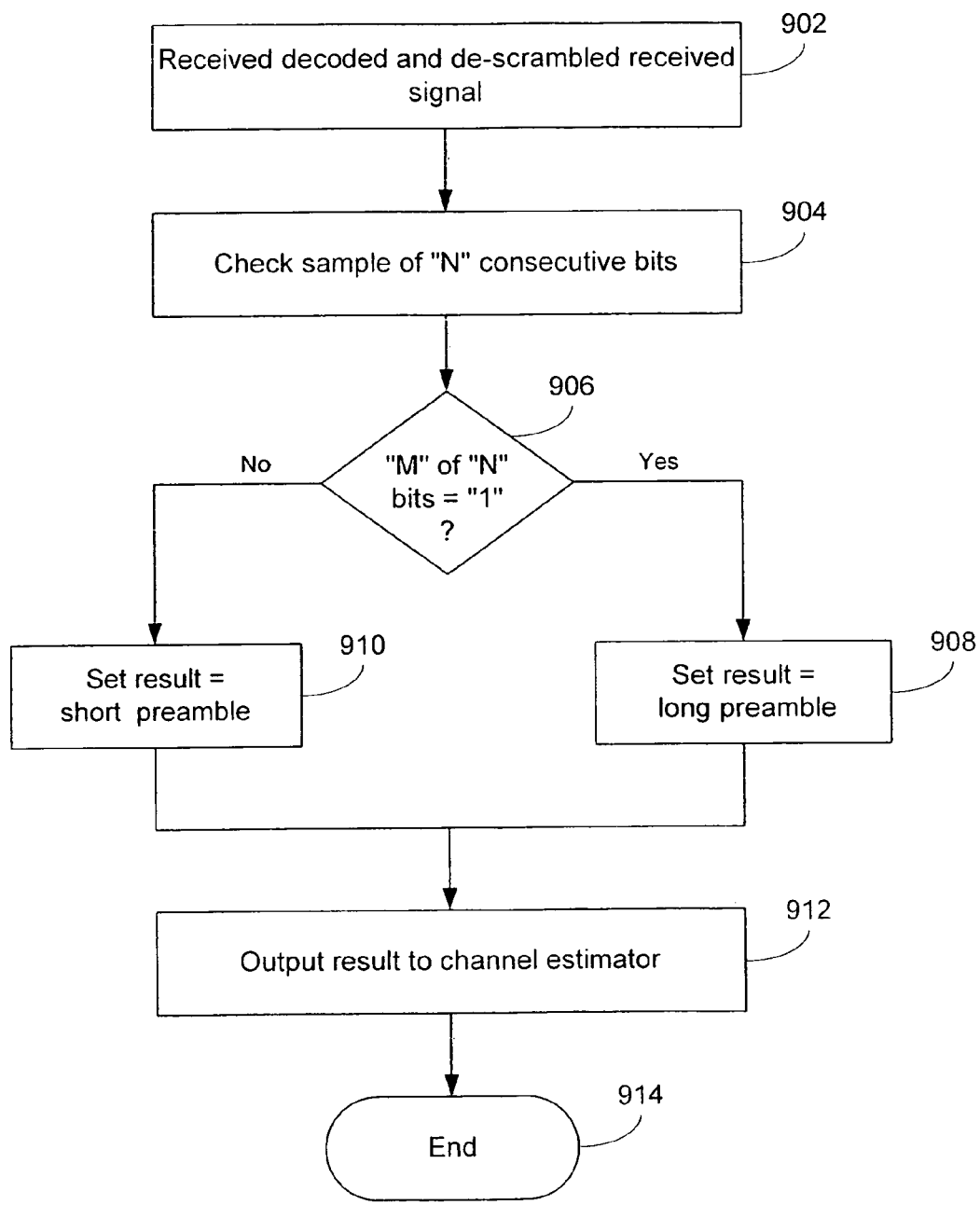
FIG. 9 is a flowchart illustrating a process used in one embodiment to perform dynamic preamble detection, as in step 512 of the process shown in FIG. 5.

FIG. 9 is a flowchart illustrating a process used in one embodiment to perform dynamic preamble detection, as in step 512 of the process shown in FIG. 5. The process shown in FIG. 9 begins in step 902, in which the decoded and de-scrambled synchronization portion of the preamble portion of the packet is received. In one embodiment, the entire synchronization portion is de-scrambled and provided in series as data to circuitry and/or components performing dynamic preamble detection. In one embodiment, only a subset of the synchronization bits are decoded and de-scrambled for use in dynamic preamble detection. In step 904, a sample of "N" consecutive synchronization bits are checked to determine which type of preamble format was used for the received packet. In one embodiment, the number of bits "N" equals 3 bits. In one embodiment, only the bits checked in step 904 are de-scrambled for dynamic preamble detection analysis, and the remaining bits of the synchronization portion of the preamble are not de-scrambled. In step 906, it is determined whether a number of bits "M" of the "N" bits sampled in step 904 have the data value "1". Under the IEEE Standard 802.11b, the synchronization portion of a long preamble format preamble comprises a series of scrambled 1's, whereas the synchronization portion of a short preamble format preamble comprises a series of scrambled O's. As noted above, under the 802.11b standard, the long preamble format is used with legacy systems operating in the 1 Mbps mode of operation. As noted above, the 1 Mbps mode of operation exhibits a lower signal-to-noise ratio than the higher data rate modes of operation, with which the short preamble format typically is used. As a result, due to imperfect channel estimation and correction and errors in decoding and de-scrambling, the decoded and de-scrambled synchronization bits checked in steps 904 and 906 will rarely, if ever, conform to the ideal set forth in the standard i.e., a series of all 1's for the long preamble format and a series of all 0's for the short preamble format. However, because the higher data rate modes of operation have a higher signal-to-noise ratio, it is more likely that the synchronization bits will be received, processed, decoded and de-scrambled accurately than with the 1 Mbps mode of operation. As a result, in one embodiment, the system is configured to assume that the long preamble format was used for the data packet if just one data value of "1" is found among the "N" bits checked in step 904 of the process shown in FIG. 9. In one embodiment, this assumption is based on the expectation that the decoded and de-scrambled synchronization bits received for a data packet sent using the long preamble format, i.e., under the 1 Mbps mode of operation, may have a mixture of 1's and 0's, instead of being purely 1's, because the lower signal-to-noise ratio is likely to result in more errors. By contrast, one would expect that the synchronization bits for data packets sent using the higher data rate modes of operation, which typically will have the short preamble, will more reliably be received and interpreted as a series of all 0's, such that if even a single value of "1" appears in the synchronization bits sampled in step 904, the preamble format used was likely the long preamble format.

If it is determined in step 906 of the process shown in FIG. 9 that a threshold number "M" of the "N" bits sampled in step 904 have a data value of "1", the process proceeds to step 908 in which the dynamic preamble detection result is set to indicate that the long preamble format was used for the data packet. If it is instead determined in step 906 that fewer than the threshold number "M" of the "N" consecutive synchronization bits sampled in step 904 have a data value equal to "1", the process proceeds to step 910 in which the result of the dynamic preamble detection process is set to indicate that the short preamble format was used. In one embodiment, the threshold number of bits "M" that must have a data value of "1" in order for a determination to be made in step 906 that the long preamble format has been used is a programmable number, which a user and/or associated system may set to a higher or lower value depending on the degree of certainty desired, channel conditions, etc. In one embodiment, the number of bits "N" sampled in step 904 is programmable. In one embodiment, M=1 and N=3 such that three synchronization bits are de-scrambled and it is determined that the long preamble format was used if one or more of the bits has a de-scrambled value of "1". Once the result of the dynamic preamble detection has been set either to indicate the long preamble format in step 908 or the short preamble format in step 910, the process shown in FIG. 9 advances to step 912 in which the dynamic preamble detection result is output to the channel estimator. The process shown in FIG. 9 then ends in step 914.

In one embodiment, of the synchronization bits only the "N" bits to be checked in steps 904 and 906 of the process shown in FIG. 9 are de-scrambled. In one embodiment, this saves the time and resources that otherwise would be needed to de-scramble the remaining bits. Typically, the result of such de-scrambling would not yield reliable de-scrambled data in any event until after the channel estimation has been completed.

By dynamically detecting the type of preamble used, as described above, the receiving system may make the maximum use of the synchronization bits available to perform synchronization operations, such as by extending the channel estimation process as described above.

Certain of the embodiments described in detail above relate to IEEE Standard 802.11b. However, the present disclosure may be applied to any context in which received data may be preceded by more than one format or type of preamble with one type of preamble comprising more and/or different data than the other. Those of ordinary skill in the art would know how to modify the embodiments described in detail above to apply the approaches disclosed herein in such other contexts.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for dynamic preamble detection, comprising:
   receiving a data packet, the data packet comprising a preamble portion, said preamble portion comprising a plurality of synchronization bits, wherein the preamble portion may be of either a first preamble type or a second preamble type, the synchronization bits comprising a first data sequence if the preamble is of the first preamble type and a second data sequence if the preamble is of the second preamble type; and
   checking at least a portion of the synchronization bits comprising the preamble portion of the received data packet to determine whether the synchronization bits comprise (1) the first data sequence or (2) the second data sequence;
   wherein:
      said determination is made dynamically while at least one synchronization operation is being performed using at least a subset of the synchronization bits;
      the first data sequence comprises a series of 1's and the second data sequence comprises a series of 0's; and
      it is determined that the preamble is of the first preamble type if said at least a portion of the synchronization bits comprises at least a threshold number of bits having a data value of "1".

2. The method of claim 1, wherein it is determined that the preamble is of the first preamble type if it is determined that the synchronization bits comprise the first data sequence.

3. The method of claim 1, wherein a preamble of the first preamble type is longer than a preamble of the second preamble type.

4. The method of claim 1, wherein a preamble of the first preamble type comprises more synchronization bits than a preamble of the second preamble type.

5. The method of claim 1, wherein the synchronization operation comprises channel estimation and a first channel estimation algorithm is used if the preamble is determined to be of the first preamble type and a second channel estimation algorithm is used if the preamble is determined to be of the second preamble type.

6. The method of claim 1, wherein the synchronization operation comprises channel estimation and a first number of synchronization bits are used for channel estimation if the preamble is determined to be of the first preamble type and a second number of synchronization bits are used for channel estimation if the preamble is determined to be of the second preamble type.

7. The method of claim 1, wherein the received packet comprises scrambled data and the step of checking comprises de-scrambling said at least a portion of the synchronization bits.

8. The method of claim 1, wherein the threshold number is programmable.

9. The method of claim 1, wherein the threshold number is one.

10. The method of claim 1, wherein said at least a portion of the synchronization bits comprises three synchronization bits.

11. The method of claim 1, wherein the data packet is associated with a wireless local area network.

12. The method of claim 1, wherein the data packet conforms to the IEEE Standard 802.11 series.

13. The method of claim 1, wherein the data packet conforms to IEEE Standard 802.11b.

14. A system for dynamic preamble detection, comprising:
a receiver configured to receive and decode a transmitted data packet, the data packet comprising a preamble portion, said preamble portion comprising a plurality of synchronization bits, wherein the preamble portion may be of either a first preamble type or a second preamble type, the synchronization bits comprising a first data sequence if the preamble is of the first preamble type and a second data sequence if the preamble is of the second preamble type; and
a processing component configured to check at least a portion of the synchronization bits comprising the preamble portion of the received data packet to make a determination whether the synchronization bits comprise (1) the first data sequence or (2) the second data sequence;
wherein:
said determination is made dynamically while at least one synchronization operation is being performed using at least a subset of the synchronization bits;
the first data sequence comprises a series of 1's and the second data sequence comprises a series of 0's; and
it is determined that the preamble is of the first preamble type if said at least a portion of the synchronization bits comprises at least a threshold number of bits having a data value of "1".

15. The system of claim 14 further comprising a de-scrambler configured to de-scramble said at least a portion of the synchronization bits.

16. A computer program product for dynamic preamble detection, the computer program product being embodied in a computer readable medium and comprising computer instructions for:
receiving a data packet, the data packet comprising a preamble portion, said preamble portion comprising a plurality of synchronization bits, wherein the preamble portion may be of either a first preamble type or a second preamble type, the synchronization bits comprising a first data sequence if the preamble is of the first preamble type and a second data sequence if the preamble is of the second preamble type; and
checking at least a portion of the synchronization bits comprising the preamble portion of the received data packet to make a determination whether the synchronization bits comprise (1) the first data sequence or (2) the second data sequence;
wherein:
said determination is made dynamically while at least one synchronization operation is being performed using at least a subset of the synchronization bits;
the first data sequence comprises a series of 1's and the second data sequence comprises a series of 0's; and
it is determined that the preamble is of the first preamble type if said at least a portion of the synchronization bits comprises at least a threshold number of bits having a data value of "1".

* * * * *